H. GALL & AMAURY DE VILLARDY DE MONTLAUR.
MANUFACTURE OF CHLORATES OF THE ALKALINE METALS AND METALS OF THE ALKALINE EARTHS.
No. 492,003.   Patented Feb. 21, 1893.
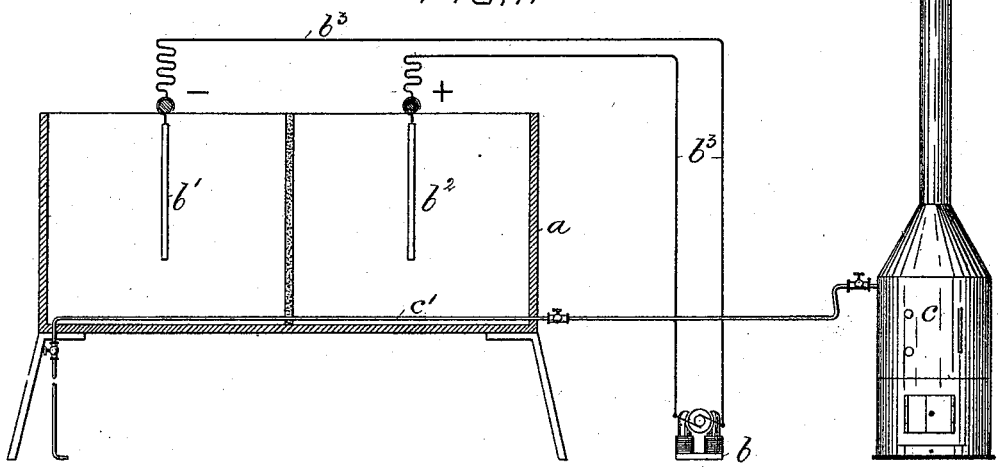
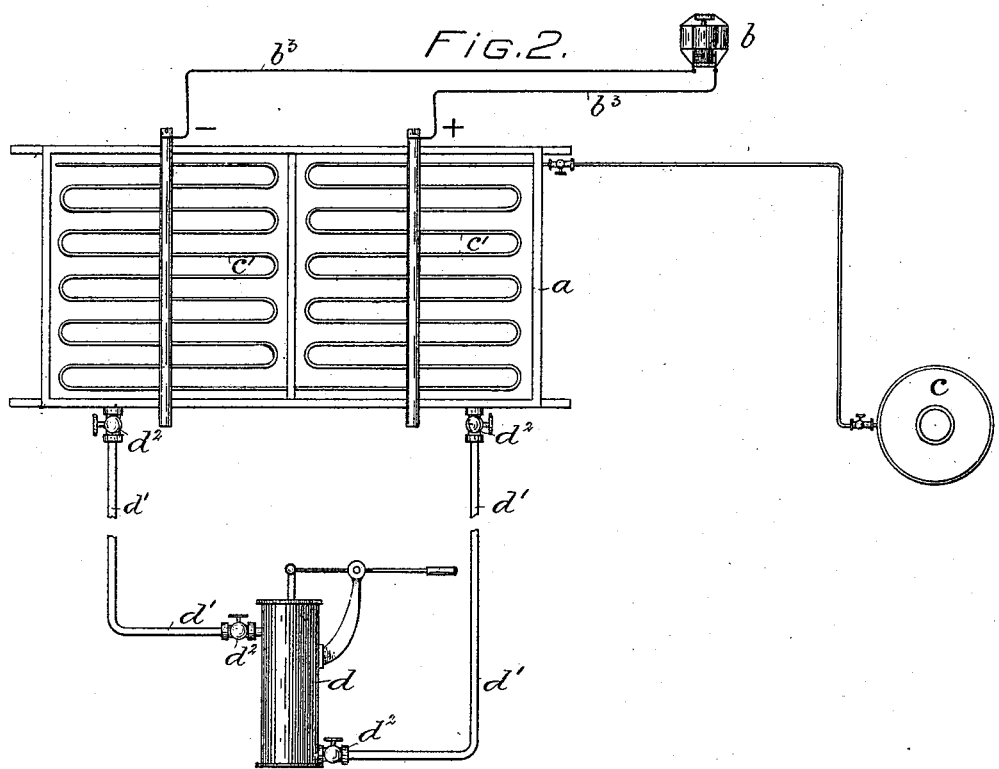

(No Model.) 2 Sheets—Sheet 2.
H. GALL & AMAURY DE VILLARDY DE MONTLAUR.
MANUFACTURE OF CHLORATES OF THE ALKALINE METALS AND METALS OF THE ALKALINE EARTHS.
No. 492,003. Patented Feb. 21, 1893.
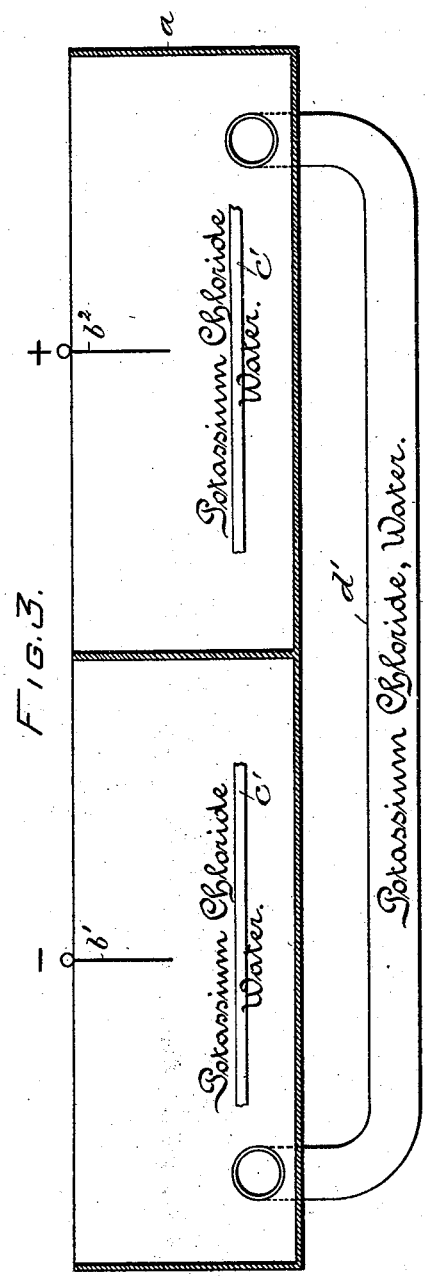
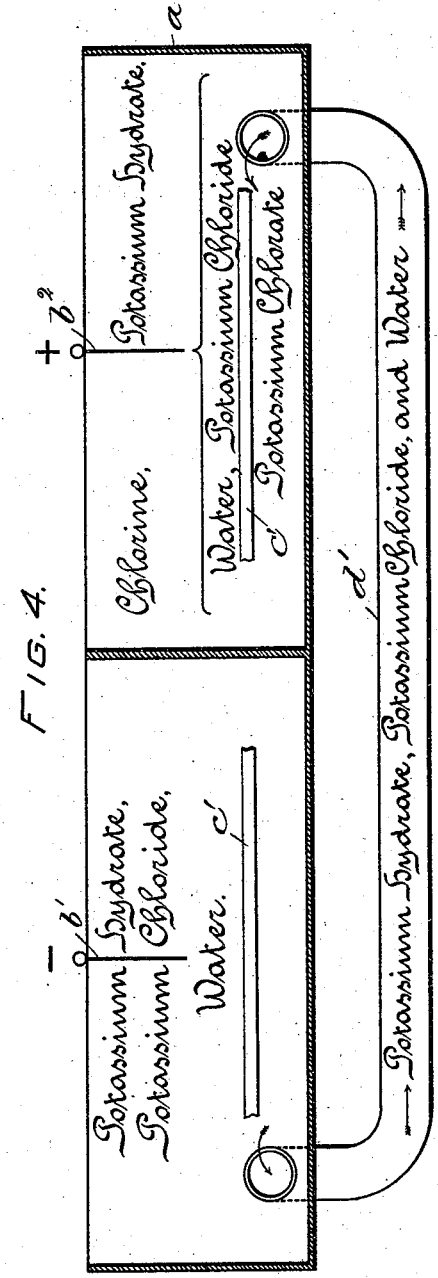
WITNESSES:
Thomas M. Smith
John W. Achard
INVENTORS.
Henry Gall & Amaury de Villardy de Montlaur.
By J. Walter Douglass.
ATT'Y.

UNITED STATES PATENT OFFICE.

HENRY GALL, OF HERMES, (OISE,) AND AMAURY DE VILLARDY DE MONTLAUR, OF PARIS, FRANCE.

MANUFACTURE OF CHLORATES OF THE ALKALINE METALS AND METALS OF THE ALKALINE EARTHS.

SPECIFICATION forming part of Letters Patent No. 492,003, dated February 21, 1893.

Application filed July 21, 1892. Serial No. 440,834. (No specimens.) Patented in France September 23, 1886, No. 179,413; in England March 29, 1887, No. 4,686; in Belgium April 1, 1887, No. 76,940; in Italy, April 28, 1887, No. 21,474, and in Austria-Hungary November 27, 1888, No. 29,962, and No. 36,227.

*To all whom it may concern:*

Be it known that we, HENRY GALL, residing at Hermes, (Oise,) and AMAURY DE VILLARDY DE MONTLAUR, residing at 41 Rue du Colisée, Paris, in the Republic of France, citizens of France, have invented certain new and useful Improvements in the Manufacture of Chlorates of the Alkaline Metals and Metals of the Alkaline Earths, (for which we have obtained Letters Patent in France, No. 179,413, dated September 23, 1886; in England, No. 4,686, dated March 29, 1887; in Italy, No. 21,474, dated April 28, 1887; in Belgium, No. 76,940, dated April 1, 1887, and in Austria-Hungary, No. 36,227, and No. 29,962, dated November 27, 1888;) and we do hereby declare the following to be a full, clear, and exact description of the invention, such as will enable others skilled in the art to which it appertains to make and use the same, reference being had to the accompanying drawings, and to letters of reference marked thereon, which form a part of this specification.

The principal object of our invention is to improve the electrolytic process of producing the chlorates of the alkaline metals and metals of the alkaline earths in such manner that the same is rendered more simple, less expensive, and more efficient than heretofore.

Our invention comprises the improvements hereinafter described and claimed.

Our improved process may be carried into effect in the following manner:—An aqueous solution of the chloride corresponding to the required chlorate, is electrolyzed in a vase or cell having two compartments separated by a porous partition, acid radicals including chlorine are liberated at the positive electrode, that is, in the positive compartment, and basic radicals are liberated at the negative electrode, that is, in the negative compartment. To avoid the reducing action of the hydrogen which is separated at the negative pole, the liquid in the negative compartment is continuously transferred by means of suitable pipes to the positive compartment. The solution is kept at a temperature of from 45° to 50°, centigrade during the electrolyzation thereof. Under these circumstances the basic radicals in the form of hydrates as they are introduced into the positive compartment unite or combine with the nascent chlorine to form the required chlorate, according to the following equation in which M, represents a basic monovalent radical

$$6Cl. + 6M,O,H, = M.ClO_3 + 5M,Cl + 3H_2O.$$

At the commencement of the operation the liquid containing the basic radicals in form of hydrates and derived from the preceding operations may be introduced into the positive compartment. During the operation the electro-motive force of the current should be sufficient to overcome the affinity of chlorine for the basic radical with which it is combined. The quantity of the current may vary within wide limits; however, in practice a current of fifty ampères per square decimeter of electrode has been uniformly employed. For separating the chlorate thus formed advantage is taken of the difference in solubility of the chlorides and chlorates of the alkaline metals and metals of the alkaline earths, or of the difference between the solubility of the chlorate in water and in a solution of the chloride. Thus in the case of some of these substances, notably potassium and barium, the chlorate is more soluble in a solution of the chloride than in water, consequently as the amount of chloride in the solution of the compartment diminishes the chlorate forming in excess therein crystallizes out and may be removed and purified by re-crystallization for use, where the chlorate is more soluble than the chloride, as is the case with sodium and calcium, the liquid of the positive compartment is evaporated and the chloride first crystallizes out and afterward the chlorate, the latter being subsequently purified for use by re-crystallization.

Our improved process may be carried into effect by means of various types of apparatus. However, for the sake of a further description of the invention we have illustrated an efficient type of such apparatus, in the accompanying drawings, in which Figure 1, is a view partly in elevation and partly in section of an electrolytic vase or cell provided with two compartments separated by a porous partition, and showing also a source of electric energy and its complemental connections and means for imparting heat to the contents of the vase or cell. Fig. 2, is a view partly in plan and partly in elevation of the same, showing exterior pipes and means for conveying the electrolyte from the negative to the positive compartment; and Figs. 3 and 4, are diagrammatical views of the electrolytic vase or cell illustrating the re-actions that occur therein.

In the drawings $a$, is an electrolytic cell or vase divided into two compartments by means of a porous partition that is not susceptible to the action of the electrolyte.

$b$, is a dynamo-electric machine or other type of generator connected with the positive and negative electrodes $b'$ and $b^2$, by means of suitable circuit connections $b^3$. The positive electrode $b'$, is preferably composed of an alloy of platinum, and ten per cent more or less of iridium, and the negative electrode is composed of iron, or more preferably of nickel.

$c$, is a furnace provided with pipe connections $c'$, for heating the electrolyte.

$d$, is a pump provided with pipe connections $d'$, and valves $d^2$, and adapted to convey the electrolyte from the negative to the positive compartment of the cell or vase $a$.

In order that our invention may be more fully understood a description will now be given of the process of manufacturing potassium chlorate from potassium chloride by means of the apparatus illustrated in the accompanying drawings and according to our invention.

An aqueous solution of potassium chloride is introduced into the electrolytic cell or vase $a$, Fig. 3, and is subjected to the electrolytic action of a current from the generator, of a strength exceeding the affinity of chlorine for potassium. A current of four and forty-three one-hundredths volts and of fifty ampères, more or less, per square decimeter of electrode has been found practically efficient for this purpose, referring to Fig. 4. This ensuing electrolytic action causes chlorine to be liberated in the positive compartment, and potassium to be liberated and converted in potassium hydrate in the negative compartment. During the electrolyses the contents of the negative compartment, which comprise potassium hydrate, are continuously conveyed by means of the pipe $d'$, and its accessories into the positive compartment.

The transfer of the contents of the negative to the positive compartment is productive of three advantageous results; first, the circulation of the fluid about the electrode in the negative compartment prevents polarization thereof by conveying away any gaseous bubbles that might tend to adhere thereto; second, the hydrate of potassium is presented to the chlorine while the latter is in the "nascent" state so that the chemical combination or union of the two in the formation of potassium chlorate is facilitated and hastened; and third, the process is rendered continuous. The resulting potassium chlorate is more soluble in the solution of the potassium chloride than in water, and consequently as the quantity of chloride diminishes and the amount of water increases, the chlorate forming in excess crystallizes out of the solution and collects at the bottom of the positive compartment from which it may be removed and purified for use.

Having thus described the nature and objects of our invention, what we claim as new, and desire to secure by Letters Patent, is—

1. The herein described process of producing chlorates of the alkaline metals and metals of the alkaline earths from the corresponding chlorides, which consists in electrolyzing an aqueous solution of the chloride in compartments separated by a porous partition to liberate acid radicals in the positive compartments and basic radicals in the negative compartment, subjecting the liquid to heat and continuously conveying the contents of the negative compartment into the positive compartment to form chlorates of the basic radicals, substantially as and for the purposes set forth.

2. The herein described improvement, which consists in employing an electrolyte containing in solution a chloride and passing a current through it between electrode compartments separated by a porous diaphragm, and depolarizing the electrode of the negative compartment by continuously conveying the contents of the negative compartment into the positive compartment, whereby the chlorine liberated in the latter is availed of in the nascent state, substantially as and for the purposes set forth.

In testimony whereof we affix our signatures in presence of two witnesses.

HENRY GALL.
AMAURY DE VILLARDY DE MONTLAUR.

Witnesses:
ROBT. M. HOOPER,
G. DE MESTOAL.